Jan. 19, 1932.  R. C. BRADLEY  1,841,567
PISTON TYPE LIQUID METER
Filed Jan. 13, 1928    7 Sheets-Sheet 4

Patented Jan. 19, 1932

1,841,567

UNITED STATES PATENT OFFICE

RICHARD C. BRADLEY, OF CHICAGO, ILLINOIS

PISTON TYPE LIQUID METER

Application filed January 13, 1928. Serial No. 246,431.

My invention relates to piston type liquid meters, and is designed to produce a device of the class described of such extreme accuracy that it can be used in the measuring of such volatile liquids as gasoline, et cetera.

To this end it consists of a pair of cylinders associated with a common inlet and a common outlet, and pistons and valve mechanism arranged so that during the movement of the pistons in each direction, both of them are drawing a charge from the inlet and forcing a charge through the outlet, together with indicating and registering apparatus to show the amount of liquid being delivered, and at the same time make a permanent count or registration thereof.

To illustrate my invention, I annex hereto seven sheets of drawings, in which the same reference characters are used to designate identical parts in all the figures, of which.

Figure 2:
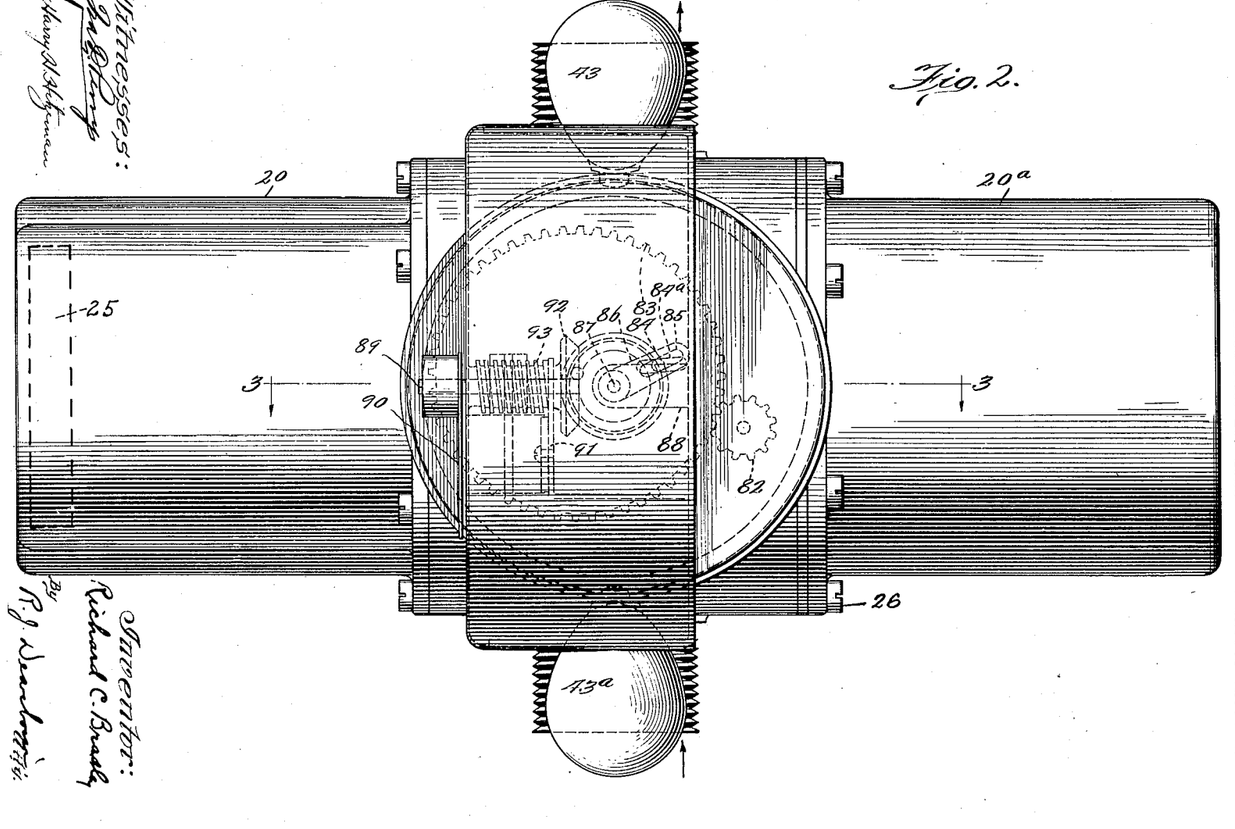
Fig. 2 is a top plan view of the same.
Figure 4:
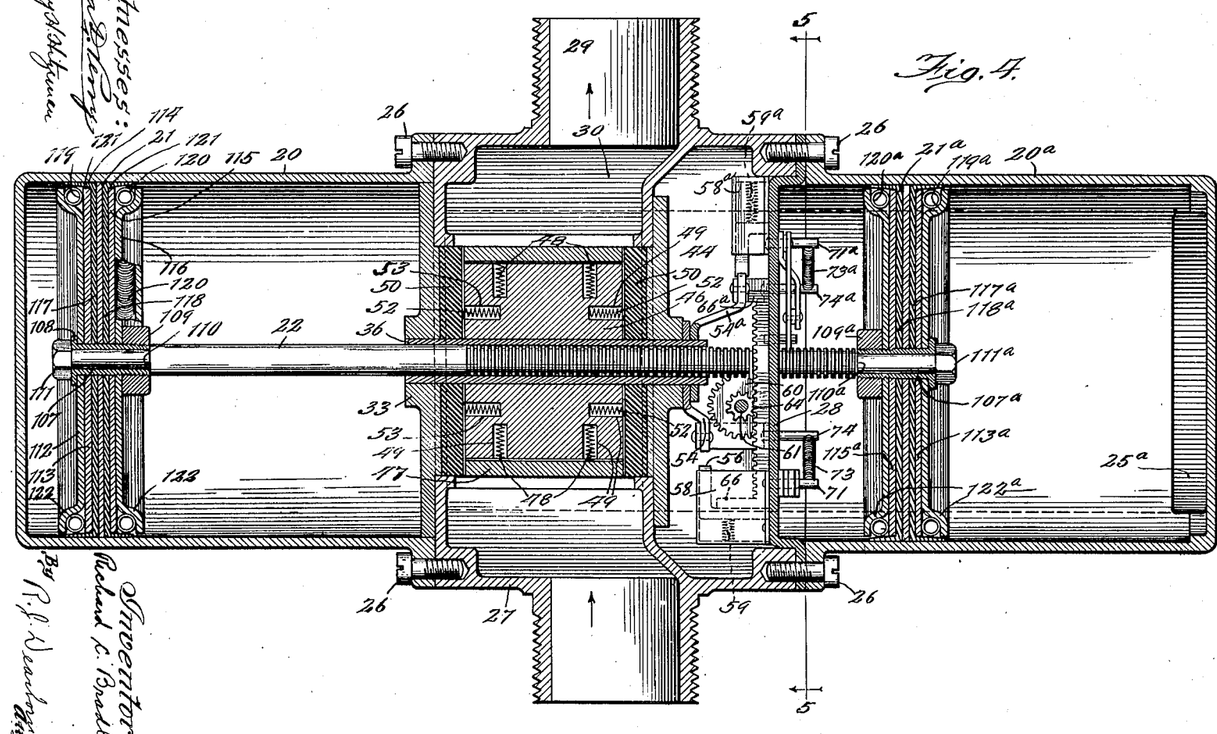
Fig. 4 is a plan view and horizontal section on the line 4—4 of Fig. 5, but with the valve seen in the intermediate position half way between its two operative positions.
Figures 10, 11, 12, 13, 14:
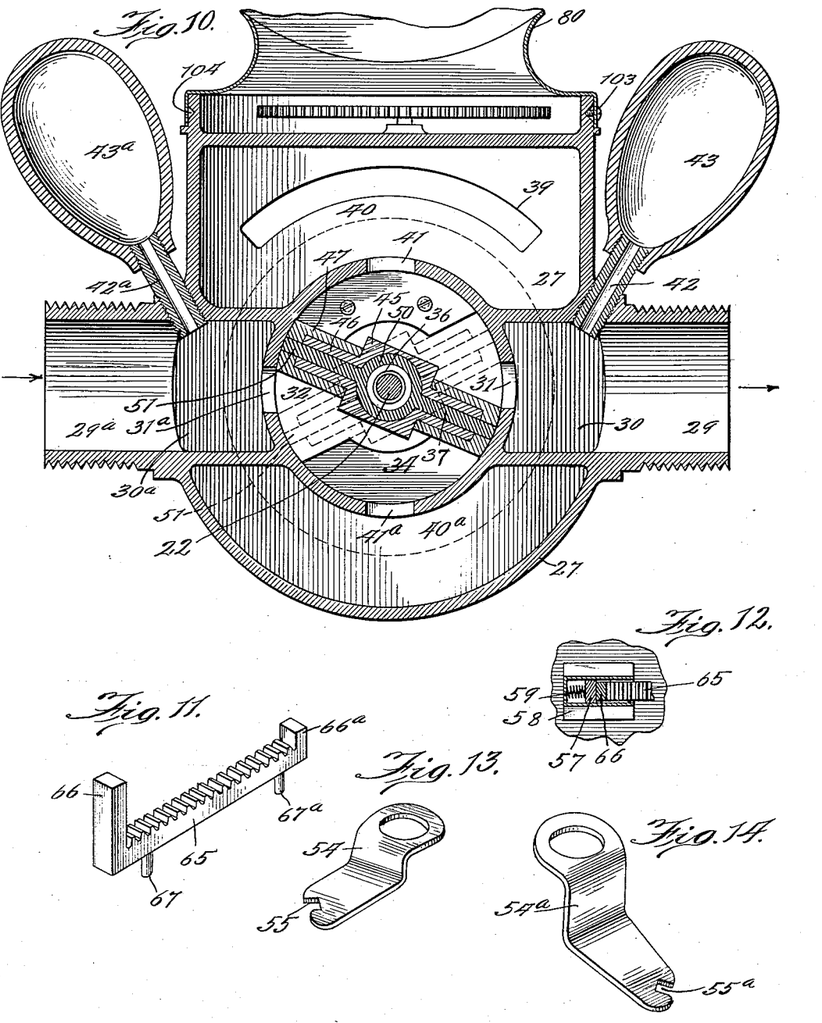
Fig. 10 is a vertical section on the line 10—10 of Fig. 3.
Fig. 11 is a perspective view of the transverse rack bar detached.
Fig. 12 is a detail in section on the line 12—12 of Fig. 8.
Figs. 13 and 14 are detached perspective views of actuating arms connected to the valve.

In carrying out my invention in its preferred form, I employ a pair of measuring cylinders 20 and 20$^a$, preferably circular in their operative cross-section, and provided with a pair of pistons 21 and 21$^a$ connected to move together in the same direction by the piston rod 22 connecting them, and having the annular teeth 23 thereon forming a rack bar for the purpose that will be subsequently described. The cylinder 20 has formed on its upper side the passage 24 connected with the outer end of the cylinder 20 by the opening 25 (seen only in dotted lines in Fig. 2), and the cylinder 20$^a$ has formed on its lower side the passage 24$^a$ connected with the outer end of the cylinder 20$^a$ by the opening 25$^a$, seen in Fig. 4. As seen in Figs. 2 and 4, the two cylinders 20 and 20$^a$ are secured by the screws 26 to the adjacent ends of the valve casing casting 27, a disc 28 being interposed between the cylinder 20$^a$ and the casting to support certain mechanism to be hereinafter described. This casting 27 has the outlet nipple 29 leading to the outlet chamber 30, which is connected by the port 31 with the cylindrical valve chamber 32, which opens by the oppositely disposed port 31$^a$ to the inlet chamber 30$^a$, which has the inlet nipple 29$^a$. The inner end of the cylinder 20 is closed by the disc 33 secured by screws to that end of the valve chamber casting and closing that end of the valve chamber except for the port 34 in its lower half, the shape and location of which is best seen in Fig. 10. The other end of the valve chamber 32 is closed by a similar disc 33$^a$ having the similar port 34$^a$ in its upper half, and secured by screws on the web 35 of the valve chamber casting. Journaled in the center of the discs 33 and 33$^a$ is the bearing sleeve 36, which has secured thereon the valve 37 to be more fully described, which cooperates with the valve chamber 32 and reciprocates from the full line position of Fig. 10 to the dotted line position, and vice versa, its swing being controlled by the fiber segments 38 and 38$^a$ secured by screws to the inner surfaces of the discs 33 and 33$^a$ respectively. The passage 24 on the top of the cylinder 20 opens by the aperture 39 into the upper chamber 40 of the valve chamber casting, which chamber is connected by the port 41 with the valve chamber 32, while the passage 24ª is connected by the opening 24ᵇ in the disc 28, and the extension passage 39ª, with the lower chamber 40ª of the valve chamber casting, which chamber 40ª is in turn connected by the port 41ª with the valve chamber 32. The piston rod 22 reciprocates through the bearing formed by the sleeve 36, and the outlet and inlet chambers 30 and 30ª are connected by the tubes 42 and 42ª with the air chambers 43 and 43ª, which are preferably employed to eliminate any possible "water hammer" in the action of the meter. The space between the disc 28, (which is of a skeleton construction) and the disc 33ª, I may call the gearing chamber 44, since it contains the gearing to be subsequently described which shifts the valve 37 at the end of each stroke of the pistons.

Figures 3, 15, 16:
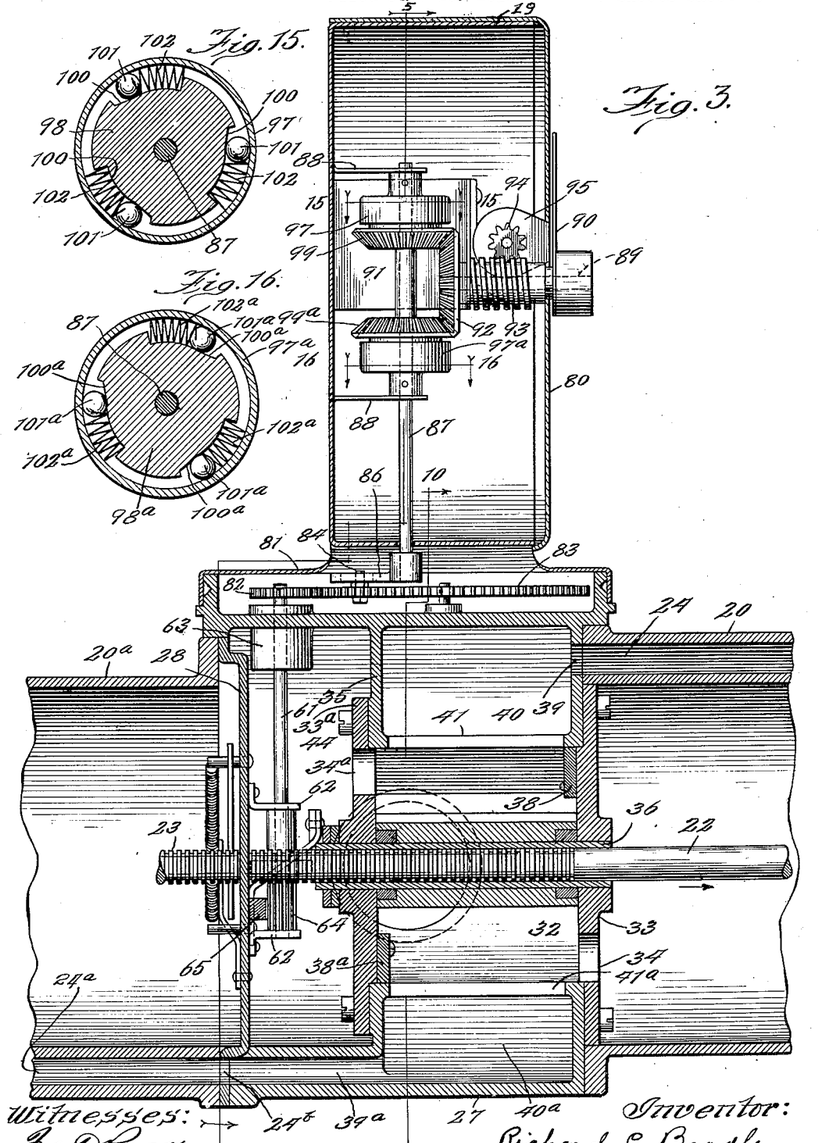
Fig. 3 is a fragmentary vertical section on the line 3—3 of Fig. 2.
Figs. 15 and 16 are horizontal sections on the lines 15—15 and 16—16, respectively, of Fig. 3, but on a larger scale.

The movement of the liquid being measured through the apparatus is as follows, reference being had to Figs. 3, 4 and 10, and assuming that the valve 37 is in the full line position of Fig. 10, and that the pistons are moving to the left from the position shown in Fig. 4 or to the right, as in Fig. 3. The oil entering the inlet nipple 29a passes through the port 31a into the lower half of the valve chamber 32 and there divides, part of it passing through the port 34 into the inner end of the cylinder 20, while the rest of it passes downwardly through the port 41a, chamber 40a, extension passage 39a, opening 24b and passage 24a and into the outer end of the cylinder 20a. At the same time the piston 21 is forcing the oil in the outer end of the cylinder 20 through the passage 24, opening 39, chamber 40, port 41, into the upper half of the valve chamber 32, and outwardly through the port 31 and outlet nipple 29. Simultaneously, the piston 21a is forcing oil from the inner end of cylinder 20a through the gear chamber 44 and port 34a into the upper half of valve chamber 32 and outwardly through port 31 and outlet nipple 29. At the end of this movement of the pistons the valve 37 is moved to the dotted line position of Fig. 10, and as the pistons move toward the right in Fig. 4, or to the left, as viewed in Fig. 3, the oil entering the inlet nipple 29a passes through the port 31a into the upper half of the valve chamber 32, where it divides, part of it passing through port 34a and the gear chamber 44 into the inner end of cylinder 20a, while the rest of it passes upwardly through port 41, chamber 40, port 39 and passage 24 into the outer end of cylinder 20. At the same time the piston 21a forces oil from the outer end of cylinder 20a through the passage 24a, opening 24b, extension passage 39a, chamber 40a, port 41a, into the lower half of valve chamber 32 and outwardly through port 31 and outlet nipple 29, it being joined in the lower half of the valve chamber 32 by the oil being forced by piston 21 from the inner portion of the cylinder 20 thru the port 34. The valve 37 may be of any desired construction that will make a liquid tight partition between the upper and lower halves of the valve chamber 32, but I preferably construct it as seen in Figs. 3, 4 and 10, of a central portion 45, square in cross-section and rigidly secured to the sleeve 36 and having the pair of oppositely disposed radial extensions 46 which have the end portions 47, U-shaped in cross-section, sliding thereon, and held by the helically coiled expanding springs 48 placed in the radial apertures 49 of the extensions 46 in liquid tight engagement with the curved wall portion of the cylindrical valve chamber 32. The flat ends of the cylindrical valve chamber 32 are engaged by the end pieces 50 having the circular central portion surrounding and sliding on the sleeve 36 and fitting in correspondingly-shaped recesses in the ends of the central portion 45, while the blade-like ends 51 of the end pieces 50 fit in correspondingly-shaped recesses in the ends of the radial extensions 46 and the U-shaped end portions 47, they being held in engagement with the flat ends of the valve chamber 32 by the helically coiled expanding springs 52 placed in the recesses 53 formed in the radial extensions 46. With this structure, all engaging surfaces of the valve 37 are spring pressed against the cooperating walls of the valve chamber.

To shift the valve 37 at the end of each stroke of the pistons, I employ the mechanism best seen in Figs. 3, 5 to 9, inclusive, and 11 to 14, inclusive. Just outside of the disc 33ª I secure on the end of the sleeve 36 the catch arms 54 and 54ª, and which have offsets, as best seen in Figs. 13 and 14, to bring the rectangular notches 55 and 55ª in their ends into the plane of the engaging ends 56 and 56ª of the L-shaped latches 57 and 57ª sliding in the rectangular housings 58 and 58ª secured on the inner side of the disc 28 and having the helically coiled expanding springs 59 and 59ª secured therein to press the latches 57 and 57ª toward the center, so that their ends 56 and 56ª will engage the notches 55 and 55ª when the arms 54 and 54ª are in their engaging position, which occurs alternately, depending upon the position of the valve 37. The teeth 23 of the piston rod 22 mesh with a gear wheel 60 secured on the shaft 61 journaled in bearings 62 secured to the inner face of the disc 28, and having its upper end extending up through a stuffing box 63 located in the top of the valve chamber casting 27. This shaft 61 has secured thereon the gear pinion 64 which meshes with the rack bar 65, seen detached in Fig. 11, and having the projecting lugs 66 and 66ª at its ends adapted to enter the housings 58 and 58ᵃ at the ends of its reciprocation, and alternately to engage the L-shaped latches 57 and 57ᵃ, as seen at the left hand end of Fig. 8, to shift their ends 56 and 56ᵃ out of the notches 55 and 55ᵃ, thereby releasing the arms 54 and 54ᵃ so that the valve 37 can be swung to its other position by the springs to be described. The rack bar 65 has the pins 67 and 67ᵃ projecting from its back through the horizontal guide slot 68 formed in the disc 28 and into the short slots 69 and 69ᵃ formed in the lower ends of the toggle levers 70 and 70ᵃ, which have their upper ends provided with pins 71 and 71ᵃ projecting rearwardly through the vertical guide slots 72 and 72ᵃ formed in the disc 28, while their outer ends have one end of the helically coiled contractile springs 73 and 73ᵃ secured thereto, the other ends of said springs being secured to the pins 74 and 74ᵃ extending through the vertical guide slots 75 and 75ᵃ in the disc 28, and carried by the lower ends of the links 76 and 76ᵃ back of the disc 28 and pivoted at their upper ends to the outer ends of the arms 54 and 54ᵃ. The levers 70 and 70ᵃ are pivoted at 77 and 77ᵃ to the swinging ends of the toggle links 78 and 78ᵃ which are pivoted at their lower ends to the disc 28.

Figures 6, 8, 9:
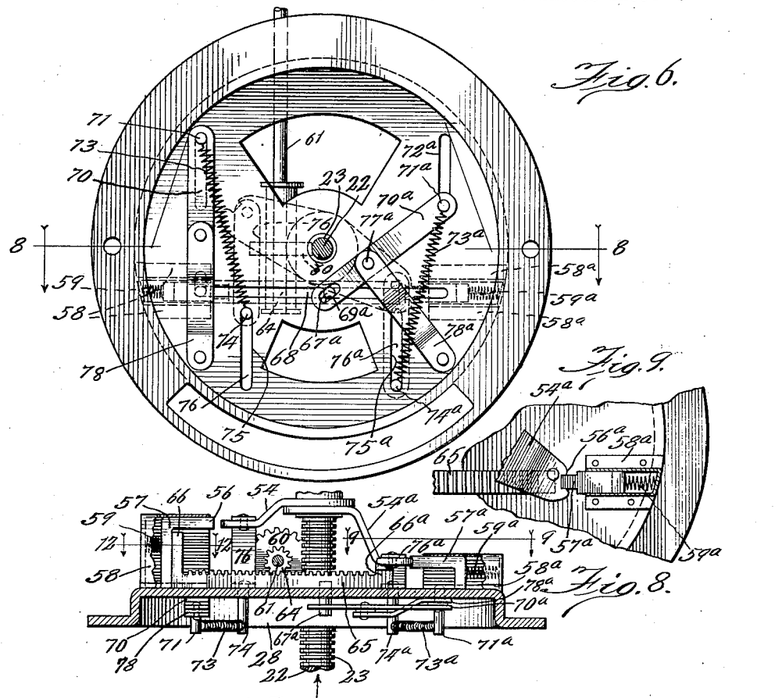
Fig. 6 is a detached view of a portion of the mechanism shown in Fig. 5.
Fig. 8 is a horizontal section on the line 8—8 of Fig. 6.
Fig. 9 is a detail in section on the line 9—9 of Fig. 8.
Figure 7:
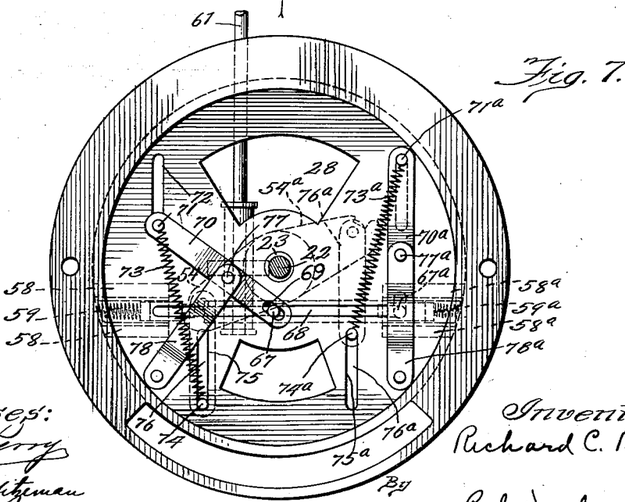
Fig. 7 is a similar view, but with the valve shifted to the other position.

The operation of the valve shifting mechanism is as follows: With the parts in the position seen in Fig. 6, the valve 37 is in the full line position of Fig. 10, and the movement of the oil through the meter is as previously described. The valve 37 is locked in the full line position by the end 56ᵃ of the L-shaped latch 57ᵃ engaging the notch 55ᵃ in the arm 54ᵃ. The movement of the piston rod 22 through the teeth 23 acting on the gear wheel 60 will rotate the shaft 61 and pinion 64 anticlockwise, as seen in Fig. 8, moving the rack bar 65 to the right, and the action of its pins 67 and 67ᵃ on the levers 70 and 70ᵃ shifting them from the position shown in Fig. 6 to that shown in Fig. 7, relieving the tension on the spring 73 and putting the spring 73ᵃ under increased tension, as at this time and just before the shift of the valve 37, the pin 74ᵃ is at the bottom of the slot 75ᵃ, the gearing back of the disc 28 being in the position shown in Fig. 6. As the projection 66ᵃ engages the latch 57ᵃ and shoves it to the right, as seen in Figs. 6 to 9, the arm 54ᵃ is released and the spring 73ᵃ quickly shifts it and the valve 37 to the position shown in Fig. 7, and in dotted lines in Fig. 10, after which the movement of the piston is reversed and the rack bar 65 is moved to the left, at the end of which movement the arm 54 is released and the tension spring 73 throws the valve 37 back to the position of Fig. 6.

Figure 5:
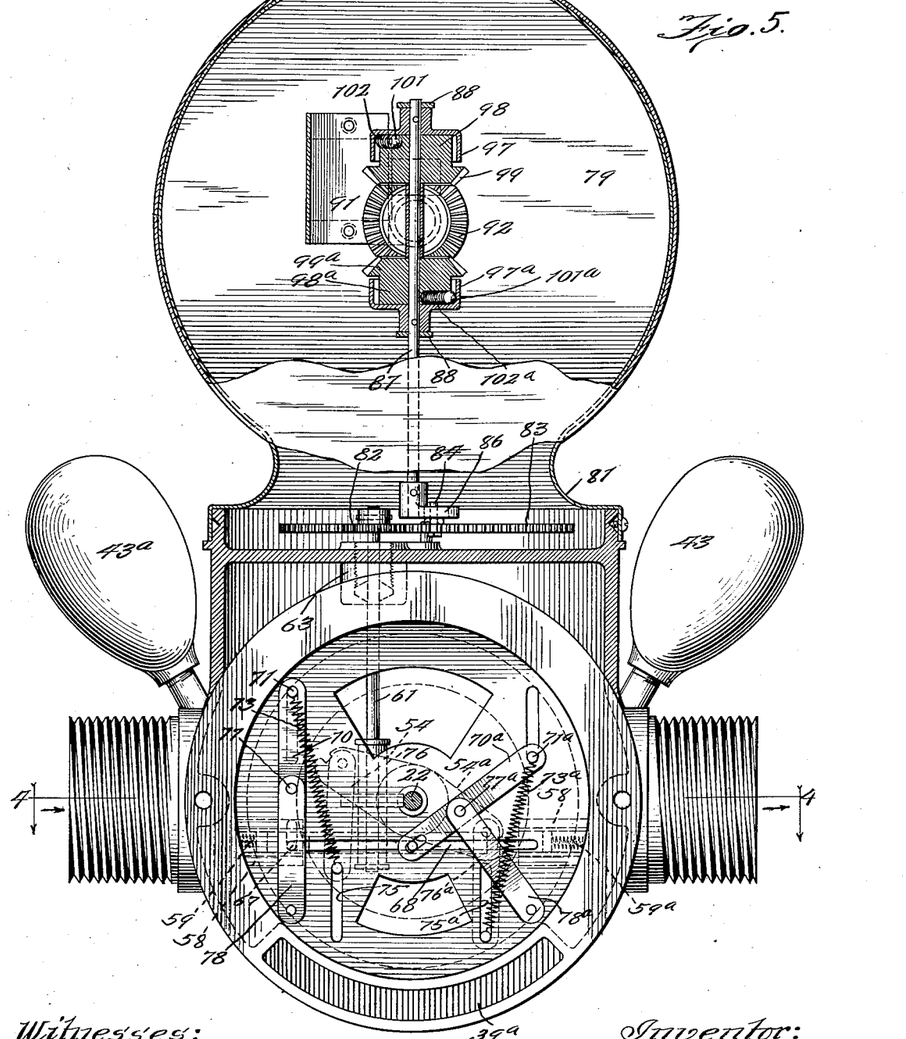
Fig. 5 is a vertical section on the line 5—5 of Fig. 3.

The gearing for indicating and registering the amount of the liquid metered is best shown in Figs. 1, 2, 3 and 5, and is actuated by the angular reciprocation of the shaft 61, previously described as extending up through the stuffing box 63 in the top of the valve chamber casting, so that the liquid being metered will not get into the casing for the registering and indicating mechanism, which consists of a flat cylindrical sheet metal casing 79, having the dial 80 on one face, graduated to cubic inches, and the extended base portions 81, which fits over and is secured to the top of the valve chamber casting, as clearly seen in Figs. 3 and 5. A spur gear pinion 82 is secured on the top of the shaft 61 and meshes with a spur gear wheel 83 which carries a pin 84 adjustably secured in the radially extending slot 84ᵃ and projecting upwardly into the slot 85 formed in the arm 86 secured on the lower end of the vertical shaft 87 journaled in a pair of bearings 88 projecting inwardly from the rear wall of the casing 79. The gearing just described will transmit the angular reciprocation of the shaft 61 to the shaft 87, but with a considerable reduction in the angular movement of the shaft 87 as compared with that of the shaft 61, and the adjustment of the pin 84 regulates the exact ratio. A horizontal shaft 89 journaled at its outer end in the dial 80 and carrying the indicator finger 90 cooperating therewith is journaled at its inner end in the bracket 91 secured for that purpose on the rear wall of the casing 79 and has secured on said inner end the miter gear 92, while between the bearings it has secured thereon the worm 93 engaging the worm wheel 94 secured on the end of the actuating shaft of the register 95 secured to the bracket 91 and extending through the dial plate 80 so that its registering wheels 96 are visible on the dial face. The gearing is so designed that as the pistons reciprocate the number of cubic inches being delivered will be indicated on the dial 80 by the movement of the finger 90, one complete rotation of which shows the delivery of one gallon or two hundred and thirty-one cubic inches. As each gallon is delivered, the units wheel of the register 95 is advanced one step.

Any suitable gearing may be employed to transform the reciprocating movement of the shaft 87 to the continuous forward movement of the shaft 89, but I preferably employ the mechanism shown in Figs. 3, 5, 15 and 16, where it will be seen that the shaft 87 has secured on it the cup-shaped one-way clutch members 97 and 97ᵃ facing each other and having therein the hubs 98 and 98ᵃ of the miter gears 99 and 99ᵃ loosely journaled on the shaft 87 and meshing with the miter gear 92. The hubs 98 and 98ᵃ forming the other clutch member, have the notches 100 and 100ᵃ therein to receive the balls 101 and 101ᵃ and the helically coiled expanding springs 102, 102ᵃ, and it will be seen that the balls 101 are adapted to wedge between the walls of the cup 97 and the bottoms of the recesses 100 and clutch the miter gear 99 to the shaft 87 as it rotates in one direction, but freeing it as it rotates in the other direction, during which time the balls 101ª will be wedged between the walls of the cup 97ª and the bottoms of the recesses 100ª, clutching the miter gear 99ª to the shaft 87.

Figure 1:
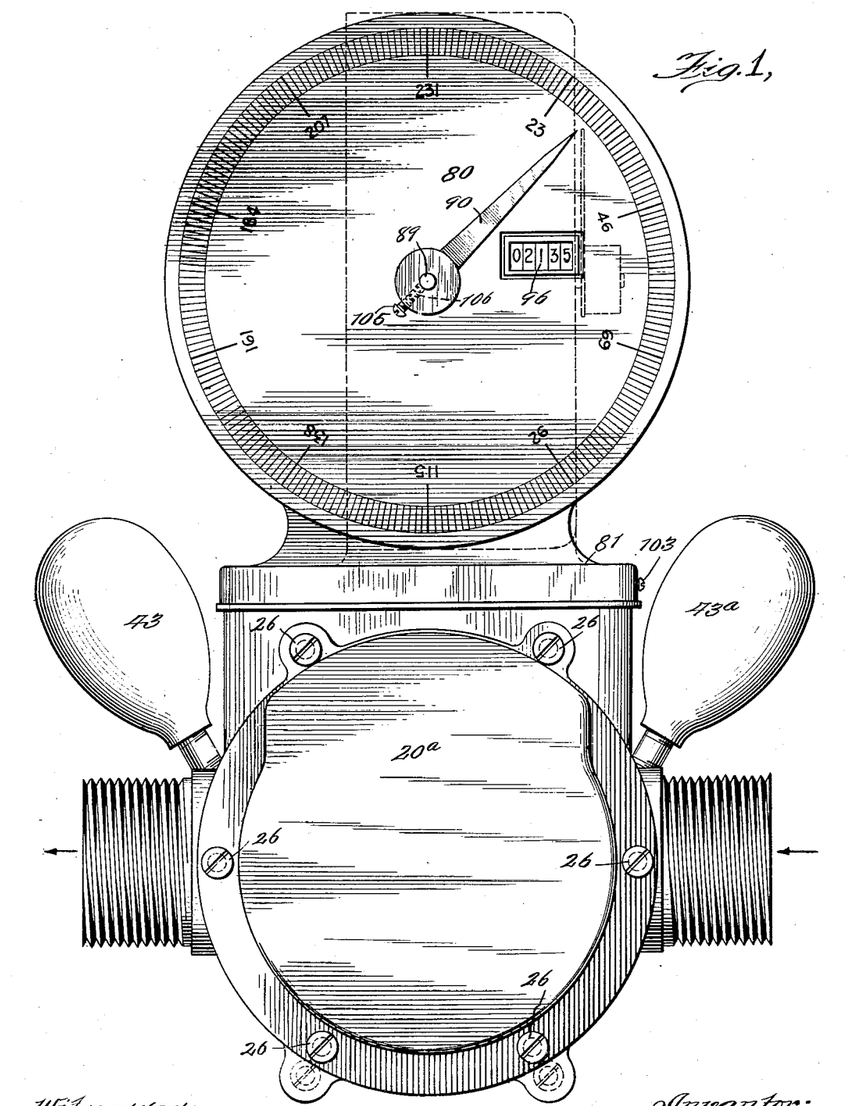
Fig. 1 is an end elevation of a meter embodying my invention.

It will be noted from Fig. 2 that the shaft 87 is concentric with the circular base portion 81 of the dial casing 79, so that the dial 80 can be set to face in any desired direction, as indicated in dotted lines in Fig. 1, it being secured on the circular top of the valve chamber casting 27 by the screws 103 passed through the base portion 81 into the annular groove 104 formed in the circular top of the valve chamber casting 27. The indicator finger 90 is secured in place frictionally (as by the screw 105 pressing the helically coiled expanding spring 106 against the end of the shaft 89), so that it can be re-set at 231 whenever a new measurement is begun, without interfering with the registering mechanism, proper.

While I may employ any desired construction of the pistons 21 and 21ª, I preferably employ the specific construction shown in Fig. 4, where it will be seen that the metallic parts are composed of stampings mounted on the sleeve 107, and clamped between the shoulder 108 formed on its outer end and the nut 109 screwed on its threaded inner end. The sleeve 107 is held against the shoulder 110 formed by reducing the end of the piston rod 22, and the nut 111 screwed on said reduced end. The piston heads are each formed of the five sheet metal discs 112, 113, 114, 115 and 116, and the oppositely-faced leather cups 117 and 118, which are held pressed against the inner wall of the cylinders 20 and 20ª by the helically coiled expanding springs 119 and 120 filling the circular space between the flange 121 of the cups 117 and 118, and the curved flanges 122 formed on the peripheries of the discs 112 and 116. The operation of this specific piston structure in keeping the pistons liquid tight in their contact with the cylinders 20 and 20ª will be apparent.

It will also be noted that there is uniform pressure on either face of the valve 37 when the valve is in either position, so that it can be swung easily under the tension of the spring 73 or 73ª, as the case may be, when its position has to be automatically shifted.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as my invention and desire to secure by Letters Patent of the United States, is—

1. In a liquid meter, the combination with a plurality of cylinders arranged end to end and a corresponding plurality of pistons cooperating therewith, of a valve chamber having inlet and outlet ports, there being separate ports and passages connecting both ends of each of the cylinders with the valve chamber, a single turnable valve movable to two positions in said chamber and cooperating with all of said ports and passages opening into the valve chamber, means for shifting said valve automatically at the end of each stroke of the pistons, a member in said valve shifting means having a rotary reciprocating movement, a pair of clutches mounted on said member, and actuated thereby alternately as the member reciprocates, and a registering operating member actuated always in the same direction by said clutches.

2. In a liquid meter, the combination with a valve chamber having inlet and outlet ports, of a pair of opposed measuring cylinders, pistons in said cylinders connected to move in unison, a valve in said valve chamber separating it into halves and adapted to occupy either of two positions alternately, said chamber and two cylinders having ports and passages so that as the pistons move in either direction, liquid will pass through the inlet port into one half of the valve chamber and thence into both cylinders on one side of the pistons, while at the same time the other side of the pistons are forcing liquid into the other half of the valve chamber and thence through the outlet port, and connections between said pistons and valve to shift the latter automatically as the limit of the movement of the pistons is reached.

3. In a liquid meter, the combination with a valve chamber having inlet and outlet ports, of a pair of opposed measuring cylinders, pistons in said cylinders connected to move in unison, a valve in said valve chamber separating it into halves and adapted to occupy either of two positions alternately, said chamber and two cylinders having ports and passages so that as the pistons move in either direction, liquid will pass through the inlet port into one half of the valve chamber and thence into both cylinders on one side of the pistons, while at the same time the other side of the pistons are forcing liquid into the other half of the valve chamber and thence through the outlet port, and connections between said pistons and valve to shift the latter automatically as the limit of the movement of the pistons is reached, said ports and passages consisting of two ports opening directly from the valve chamber into the adjacent ends of the two cylinders and two passages connecting the outer ends of the two cylinders with the valve chamber, and said valve in one position connecting the inlet port with the bore of one cylinder and the outlet port with the bore of the other cylinder, and vice versa in the other position.

4. In a liquid meter, the combination with a valve chamber having an inlet port and an outlet port, of upper and lower chambers located respectively above and below the valve chamber and each connected therewith by said inlet and outlet ports, a pair of opposed measuring cylinders opening on their inner ends directly to the valve chamber and one having a passage from its outer end opening into said upper chamber and the other having a similar passage from its outer end opening into said lower chamber, pistons in said cylinders connected to move in unison, a valve in said valve chamber in effect separating it into two halves and adapted to occupy either of two positions aternately, said ports and passages being so designed and located that as the pistons move in either direction liquid will pass through the inlet port into one half of the valve chamber and thence into both cylinders on one side of the pistons, while at the same time the other side of the pistons are forcing liquid into the other half of the valve chamber and thence through the outlet port, and connections between said pistons and valve to shift the latter automatically as the limit of the movement of the pistons is reached.

5. In a liquid meter, the combination with a generally cylindrical valve chamber formed with valve contacting surfaces curved on the arc of a circle and having opposed inlet and outlet ports, of a pair of opposed measuring cylinders, pistons in said cylinders connected to move in unison, a valve in said valve chamber separating it into halves and adapted to occupy either of two positions alternately, said chamber and two cylinders having ports and passages so that as the pistons move in either direction liquid will pass through the inlet port into one half of the valve chamber and thence into both cylinders on one side of the pistons, while at the same time the other sides of the pistons are forcing liquid into the other half of the valve chamber and thence through the outlet port, and connections between said pistons and valve to shift the latter automatically as the limit of the movement of the pistons is reached, said valve consisting of a central portion fixed to its shaft with curved contact portions mounted thereon so as to be movable to and from the shaft, and springs located between the central portion and the contact portions to keep the latter in contact with the curved valve contacting surfaces of the valve chamber.

6. In a liquid meter, the combination with a generally cylindrical valve chamber formed with valve surfaces curved on the arc of a circle and having opposed inlet and outlet ports, of a pair of opposed measuring cylinders, pistons in said cylinders connected to move in unison, a valve in said valve chamber separating it into halves and adapted to occupy either of two positions alternately, said chamber and two cylinders having ports and passages so that as the pistons move in either direction liquid will pass through the inlet port into one half of the valve chamber and thence into both cylinders on one side of the pistons, while at the same time the other sides of the pistons are forcing liquid into the other half of the valve chamber and thence through the outlet port, and connections between said pistons and valve to shift the latter automatically as the limit of the movement of the pistons is reached, said valve consisting of a central portion fixed to its shaft with curved contact portions mounted thereon so as to be movable to and from the shaft, and straight contact portions mounted therein so as to be movable along the axis of the shaft to engage the flat ends of the valve chamber, and springs located between the central portion and the contact portions and the straight portions to keep said contact portions in contact with their respective cooperating surfaces of the valve chamber.

7. In a liquid meter, the combination with a pair of opposed cylinders and pistons cooperating therewith, of a valve chamber, having inlet and outlet ports, interposed between said cylinders, and separate ports communicating with the adjacent ends of said cylinders, means communicating with the valve chamber for conducting liquid to and from the non-adjacent ends of said cylinders, a piston rod connecting the pistons and reciprocating through said valve chamber and a valve pivoted on the piston rod in the valve chamber, and means for shifting the valve automatically at the end of each stroke of the pistons.

8. In a liquid meter, the combination with a pair of opposed cylinders and pistons cooperating therewith, of a valve chamber interposed between said cylinders and having inlet and outlet ports, separate ports communicating with the adjacent ends of said cylinders, means communicating with the valve chamber for conducting liquid to and from the non-adjacent ends thereof, a piston rod having rack teeth formed thereon connecting the pistons and reciprocating through said valve chamber, a valve pivoted on the piston rod in the valve chamber, and means for shifting the valve automatically at the end of each stroke of the pistons, said means being actuated by the piston rod through said rack teeth.

9. In a liquid meter, the combination with a plurality of cylinders and a corresponding plurality of pistons cooperating therewith, of a valve chamber having inlet and outlet ports, there being separate ports and passages connecting both ends of each of the cylinders with the valve chamber, a single valve movable to two positions in said chamber and cooperating with all of said ports and passages opening into the valve chamber, and means for shifting said valve automatically at the end of each stroke of the pistons, said means comprising a pair of detent arms secured to the valve, a pair of spring pressed latches adapted to cooperate alternately with said detent arms, a pair of springs, means connecting said springs to said detent arms so that said springs are alternately put under tension as the pistons reciprocate, and means for releasing the detent arms from the latches at the end of the strokes of the pistons.

10. In a liquid meter, the combination with a plurality of cylinders and a corresponding plurality of pistons cooperating therewith, of a valve chamber having inlet and outlet ports, there being separate ports and passages connecting both ends of each of the cylinders with the valve chamber, a single valve movable to two positions in said chamber and cooperating with all of said ports and passages opening into the valve chamber, and means for shifting said valve automatically at the end of each stroke of the pistons, said means comprising a pair of detent arms secured to the valve, a pair of spring pressed latches adapted to cooperate alternately with said detent arms, a pair of springs, means connecting said springs to said detent arms so that said springs are alternately put under tension as the pistons reciprocate, and means for releasing the detent arms from the latches at the end of the strokes of the pistons, said releasing means including a rack bar adapted to be reciprocated by the pistons and having its end adapted alternately to contact with and move the latches and gearing operatively connecting said bar and said pistons.

11. In a liquid meter, the combination with a plurality of cylinders and a corresponding plurality of pistons cooperating therewith, of a valve chamber having inlet and outlet ports, there being separate ports and passages connecting both ends of each of the cylinders with the valve chamber, a single valve movable to two positions in said chamber and cooperating with all of said ports and passages opening into the valve chamber, and means for shifting said valve automatically at the end of each stroke of the pistons, said means comprising a pair of detent arms secured to the valve, a pair of spring pressed latches adapted to cooperate alternately with said detent arms, a pair of springs, means connecting said springs to said detent arms so that said springs are alternately put under tension as the pistons reciprocate, and means for releasing the detent arms from the latches at the end of the strokes of the pistons, said tensioning and releasing means comprising a rack bar reciprocated through gearing by the pistons, a pair of toggles, said rack bar having its ends adapted alternately to contact with and move the latches and having pins engaging said pair of toggles which have the springs attached to one end so that they are tensioned as the toggles are straightened by the movement of the rack bars.

12. In a liquid meter, the combination with a plurality of cylinders arranged end to end and a corresponding plurality of pistons co-operating therewith, of a valve chamber having inlet and outlet ports, there being separate ports and passages connecting both ends of each of the cylinders with the valve chamber, a single turnable valve movable to two positions in said chamber and cooperating with all of said ports and passages opening into the valve chamber, means for shifting said valve automatically at the end of each stroke of the pistons, and mechanism actuated by the valve shifting means to register the amount of liquid passing through the meter, said mechanism including adjustable connections between two elements therein so that the exact amount of liquid delivered can be registered.

13. A liquid meter comprising a plurality of cylinders, a corresponding plurality of pistons co-operating therewith, means for connecting said pistons so that they will move in unison, a valve chamber having inlet and outlet ports, there being separate ports and passages connecting the valve chamber with both ends of each of the cylinders, a turnable valve movable to two positions in the valve chamber for regulating the flow of liquids through said ports and passages and means for automatically shifting said valve at the end of each stroke of the pistons.

14. A liquid meter comprising a plurality of cylinders, a corresponding plurality of pistons co-operating therewith, means for connecting said pistons so that they will move in unison, a valve chamber having inlet and outlet ports, there being separate ports and passages connecting the valve chamber with both ends of each of the cylinders, a turnable valve movable to two positions in the valve chamber for regulating the flow of liquids through said ports and passages and means responsive to the movement of the means connecting said pistons for shifting said valve at the end of each stroke of the pistons.

In witness whereof I have hereunto set my hand this 27th day of December, 1927.

RICHARD C. BRADLEY.